United States Patent [19]

Gigante

[11] Patent Number: 4,566,833
[45] Date of Patent: Jan. 28, 1986

[54] DEVICE TO BUNDLE ROLLED BARS OR ROLLED SECTIONS

[75] Inventor: Sergio Gigante, Udine, Italy

[73] Assignee: Danieli & C. Officine Meccaniche S.p.A., Buttrio, Italy

[21] Appl. No.: 728,455

[22] Filed: May 1, 1985

Related U.S. Application Data

[63] Continuation of Ser. No. 508,195, Jun. 27, 1983, abandoned.

[30] Foreign Application Priority Data

Jul. 9, 1982 [IT] Italy ................ 83420 A/82

[51] Int. Cl.⁴ ............ B65G 57/04; B65G 57/18
[52] U.S. Cl. ................. 414/30; 414/45; 414/56; 414/74; 414/736; 414/737
[58] Field of Search .......... 414/30, 45, 56, 74, 414/732, 733, 736, 737

[56] References Cited

U.S. PATENT DOCUMENTS

| | | | |
|---|---|---|---|
| 3,880,296 | 4/1975 | Kaplan ................ | 414/45 |
| 3,920,132 | 11/1975 | Cleland et al. ........ | 414/74 X |
| 3,957,163 | 5/1976 | Tanzler ............... | 414/56 |
| 4,278,377 | 7/1981 | Elineau ............... | 414/30 |
| 4,392,765 | 7/1983 | Barton et al. ......... | 414/30 |

FOREIGN PATENT DOCUMENTS

| | | |
|---|---|---|
| 0009037 | 11/1982 | European Pat. Off. . |
| 1183020 | 12/1964 | Fed. Rep. of Germany . |
| 1186408 | 1/1965 | Fed. Rep. of Germany ........ 414/74 |
| 1235811 | 3/1967 | Fed. Rep. of Germany . |
| 1258796 | 1/1968 | Fed. Rep. of Germany . |
| 1296578 | 5/1969 | Fed. Rep. of Germany . |
| 2731559 | 1/1979 | Fed. Rep. of Germany ........ 414/30 |
| 2940416 | 4/1981 | Fed. Rep. of Germany ........ 414/56 |
| 2156307 | 5/1973 | France . |
| 2092091 | 8/1982 | United Kingdom . |

Primary Examiner—Leslie J. Paperner
Attorney, Agent, or Firm—Stevens, Davis, Miller & Mosher

[57] ABSTRACT

A device to bundle rolled bars which are advantageously flanged and channel sections coming from a delivery line, comprising a conveyor cooperating with retractable separating and sorting stops and a two-armed lever able to take the bars from the conveyor and to place them in successive layers on suitable gathering and discharge conveyors, the two-armed lever being keyed to and supported on a central shaft and whereby the end of at least one arm of the lever is equipped with a swinging magnetic head which is pivoted at one of its ends on the end of the arm according to a horizontal axis substantially crosswise to the arm, and whereby the magnetic head is rotated and positioned so as to move towards and prolong the lengthwise axis of the relative arm when it is taking, carrying and laying down the bars.

5 Claims, 4 Drawing Figures

DEVICE TO BUNDLE ROLLED BARS OR ROLLED SECTIONS

This application is a continuation of application Ser. No. 508,195 filed June 27, 1983, now abandoned.

This invention relates to a device to bundle rolled bars or rolled sections.

More specifically, the device of this invention can take a pre-set number of rolled bars coming from a delivery line and bundle them in successive layers on suitable gathering means cooperating with a discharge line.

For instance, in the case of flanged sections or channel sections the device bundles alternate layers of sections positioned upright and upside down. In the case of flanged sections each layer forming the bundle consists alternately of a number of sections greater or smaller by one unit than the immediately previous layer and immediately successive layer in the bundle so as to bind the layers together as well as possible during the bundling phase.

Devices of the prior art entail some technical problems linked to the high rate of working imposed by high-speed rolling plants.

So as to service this type of plant, as the layers in the bundle cannot exceed a given size or number of bars owing to reasons linked to specific requirements or to the handling of the bundle itself thereafter, it is necessary to provide the bundling device with a high rate of formation and bundling of the layers unless many devices are arranged side by side on a delivery line. However, if many devices are arranged side by side, such a lay-out would involve problems of cost and possibly of mutual coordination of the devices to withdraw the bars.

An object of the invention is to provide a device to bundle together rolled bars, advantageously flanged or channel sections, coming off a delivery line. The device consists substantially of a conveyor cooperating with sorting stops and separating stops and also of transfer means able to withdraw the bars from the conveyor and put them in successive layers, which are advantageously the right way up and upside down alternately, on a suitable discharge line. The device is characterized by the fact that the retractable separating stops can sort at the same time a pair of layers of bars of a small size or else one single layer of bars of a big size as pre-set on the conveyor, in a position suitable for being withdrawn at the same time by transfer means with a magnetic head. The transfer means consist of a two-armed lever rotating on a central shaft and comprising at one or both of the ends of the arms of the lever an articulated magnetic head which is brought alternately into cooperation with the conveyor and the discharge line.

According to the invention the bundling device enables the times for bundling the bars to be reduced.

Moreover, while handling a high output, it is possible to bundle at the same time several bundles of a smaller size or one bundle of a big size.

The device of the invention eliminates the device which overturns the sections and which cooperates with the conveyor, since the overturning action is carried out by each magnetic head.

Such a lay-out also permits a better coordination of functions than is possible in existing devices.

Other details and features of the invention will stand out from the description given below by way of non-limitative example and with reference to the accompanying drawings, in which.

Figure 1:
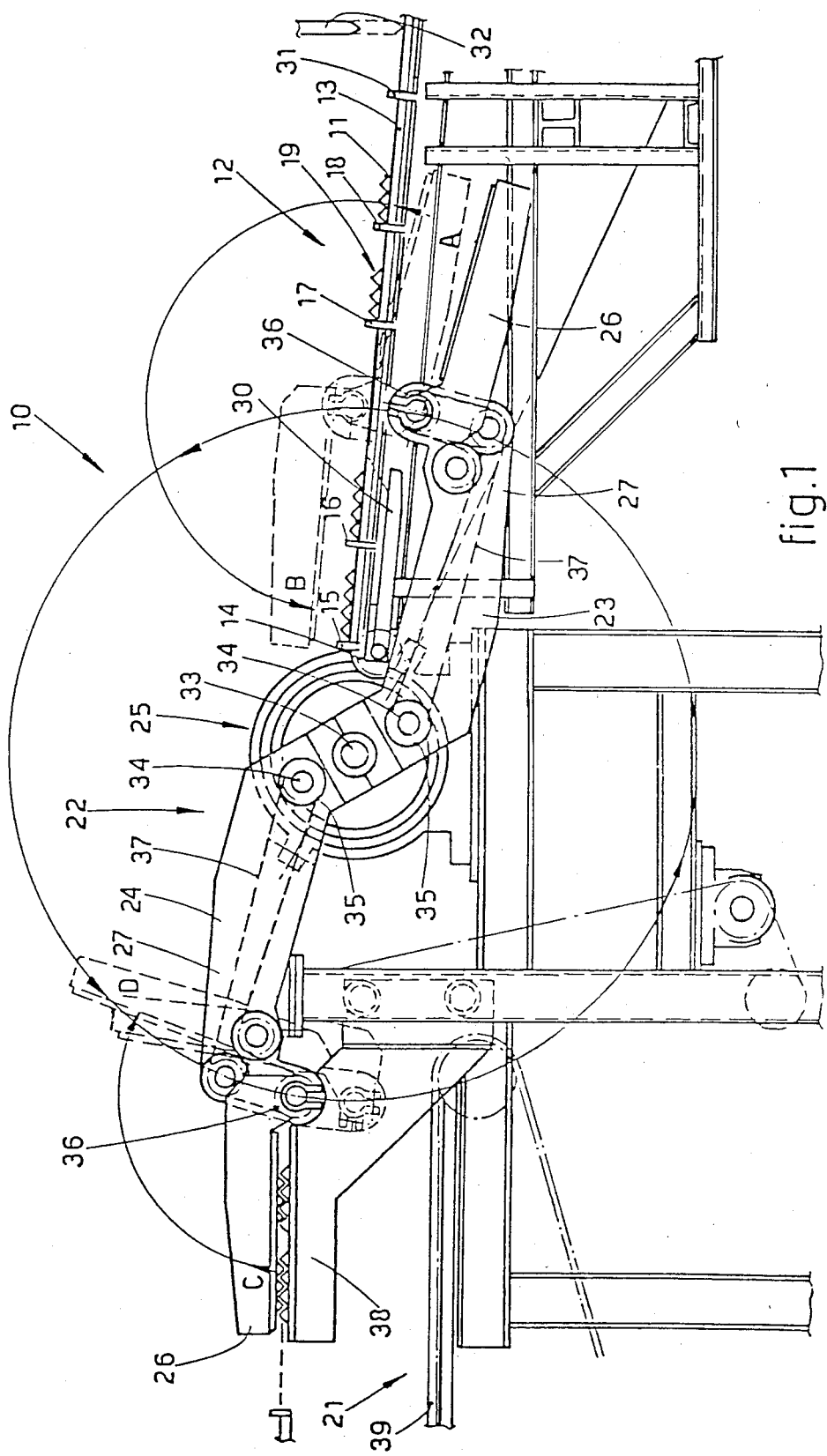
FIG. 1 shows a first preferred embodiment of the device of the invention having two magnetic heads.

In FIG. 1 there is shown a device 10 for bundling rolled bars 11 which comprises a conveyor 12 able to withdraw in a known way the bars 11 coming from the delivery line.

The conveyor 12 consists of a belt 13 or chain tensioned by pulley means 14 and driven by electromechanical actuators. The flow of rolled bars 11 on conveyor 12 is regulated by retractable separator stops 15, 16, 17. 18, 31. The stops act to halt the flow of bars 11 arriving one behind another at set positions on the conveyor 12.

The stops 15, 16, 17, 18 are located in two zones on the conveyor, namely, one pair of stops 15, 16 is located in the end zone of the conveyor, whereas the other pair of stops 17, 18 is located in an intermediate zone of conveyor 12.

The stops 15, 16, 17, 18 can be moved and positioned along the length of the conveyor 12 so as to position suitably the layers of the bars 11 which abut on the stops.

To be more exact, when the bars 11 are flanged or channel sections, each bundle 20 is formed with layers alternately positioned upright or upside down.

In the case of flanged sections, so as to bind together as well as possible the layers of bar 11 forming a bundle 20, each layer 19 consists of a number of bars 11 alternately greater or lesser by one unit than the number in the preceding and successive layers 19 in the same bundle 20.

This is obtained during the sorting of the bars 11 by means of retractable separating stop 31, which cooperates with a wedge 32 to halt the flow of bars and can be positioned along the length of the conveyor 12 to suit the number of bars 11 which it is wished to separate between stop 31 and the stop wedge 32 for each layer 19 of the bundle to be formed.

The movement of the layers 19 from the conveyor 12 to the formation and discharge line 21 of the bundles is carried out with a transfer means which consists of a two-armed 23, 24 rotating lever 22 keyed onto a central shaft 33 pivoting on suitable supports 25, whereby shaft 33 is made to rotate by an electromechanical or oleodynamic system.

According to the preferred embodiment of the invention the two-armed lever 22 has at each of its ends 27 a magnetic head 26 rotatably anchored to the end with a horizontal pivot lying substantially crosswise to the repsective arm.

The movement of each magnetic head 26 in relation to the end of the respective arm 23 or 24 is governed by specific means consisting of an oleodynamic or electromechanical system solidly fixed to the lever 22 during the movement of the head.

According to the preferred embodiment of the invention the oleodynamic or electromechanical system proposed for moving the relative magnetic head 26 is secured to a flange solidly fixed to central shaft 33 and actuates the rotation of a shaft 34 pivoted on the flange and on the two-armed lever 22 and positioned at the side of and parallel to central shaft 33.

The lateral shaft 34 comprises, in correspondence with the two-armed lever 22, a pinion 35 connected by chain means 37 to another pinion 36 which is coaxial with the axis of rotation of the magnetic head 26 and solidly fixed to head 26.

According to the invention it is possible to arrange advantageously for the operation many bundling devices side by side with the first by elongating the central shaft and the shafts proposed for moving the magnetic heads and by inserting supports of the type shown in FIG. 1 at suitable intervals.

During rotation of the two-armed lever each head 26 is brought alternately into cooperation with the conveyor 12 and with a vertically movable storage surface 38 which is able by means of a photoelectric cell means to keep substantially constant the distance between the magnetic head 26 at position C and the upper layer of bars 11 in each bundle 20 being formed during the progressive formation of the bundles 20.

When the bundles 20 have been formed, storage surface 38 is made to descend further so as to deliver the bundles 20 to the discharge line 21.

Figure 2:
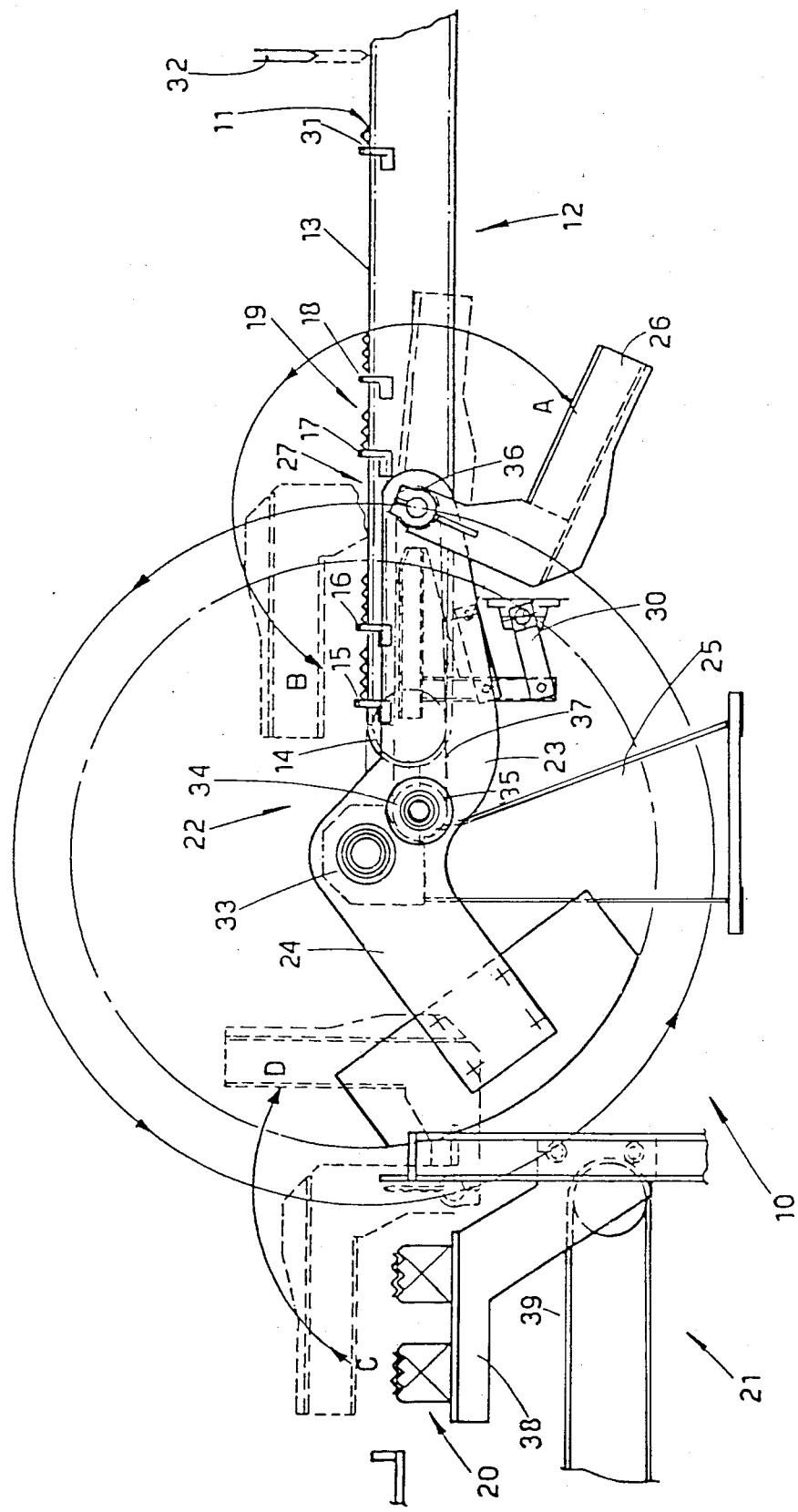
FIG. 2 shows a second embodiment of the device of the invention having only one magnetic head.
Figure 4:
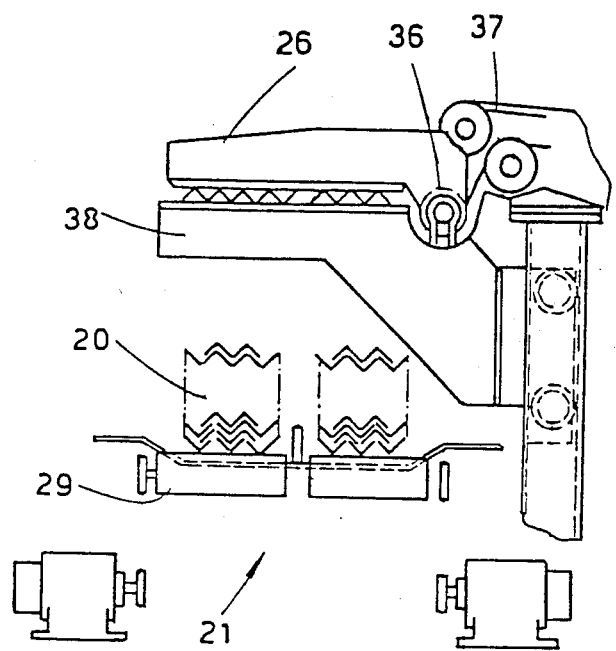
FIG. 4 shows the device of the invention in cooperation with a discharge line with powered rollers.
Figure 3:
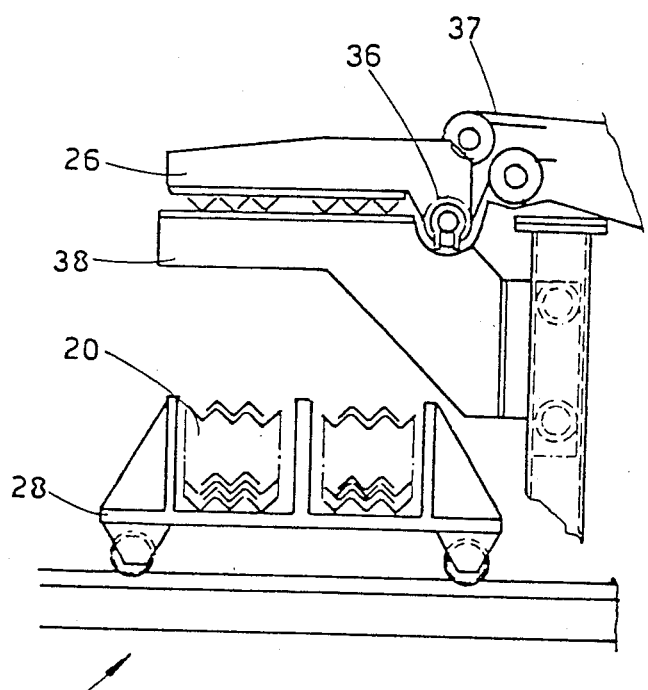
FIG. 3 shows the device of the invention in cooperation with a discharge line with movable carriages.

The discharge line 21 may consist of rail-borne carriages 28 able to move and to lodge separately the pairs of layers 19 forming progressively and, at the same time, the two bundles of bars to be discharged, as is shown for instance in FIG. 3, or else it may consist of a conveyor split into two parts and consisting of powered rollers 29 which are actuated whenever the formed bundles have to be conveyed, as shown in FIG. 4 for instance, or it may consist of slidable belt means 39, as shown in FIGS. 1 and 2.

According to the invention the bundling device 10 can make two bundles of small sizes at the same time when the sections concerned have a high bundling coefficient, such as flat or square sections, or can make only one bundle of bigger sizes when the sections have a low bundling coefficient, thus keeping bundles of diverse sections within a given range of weights.

The sections are bundled by putting one layer 19 upside down on top of an upright layer 19 when the sections are flanged or channel sections, whereas H-type sections and I-type sections can be bundled only with the use of upright layers the same way up as each other.

With reference to bundling flanged sections, the possible working cycle of the device 10 according to the preferential embodiment is as follows: one layer of sections having a number "n" abuts against the stop 15, which is in its raised position; the stop 16 is then raised and another layer of "n" sections abuts thereagainst; the stop 17 is then raised and a layer of "n minus one" sections abuts thereagainst; the stop 18 is then raised and a layer of "n minus one" sections abuts thereagainst.

The two-armed lever 22 stays still, while the magnetic head 26 of the arm 23 is magnetized and rotates counter-clockwise from position A to position B, at the same time picking up the sections abutting on the stops 17 and 18, overturning them and holding them in their overturned position.

When magnetic head 26 of the arm 23 is in position B, the device 30 to lift the sections starts moving upwardly and fits the sections of the two layers abutting on the stops 15, 16 in between the sections of the two layers which were taken from the stops 17-18; the device 30 then returns to rest. The layers which abutted stops 15, 16 are now held by the magnetic head.

At this time the other magnetic head 26 on the arm 24 lies at position D. The two-armed lever 22 rotates counter-clockwise while at the same time the magnetic head 26 of arm 23 rotates clockwise and straightens out, thus reaching position C.

The magnetic head 26 of the arm 23 is demagnetized, and the layers thus formed with one layer, split in two, of upright sections and with one layer, split in two, of sections upside down are left on appropriate containers means.

The position now is that the magnetic head 26 of the arm 23 has left its sections in the container means, the arm 24 is in the previous position of the arm 23 and the head 26 of the arm 24 is at position A.

The magnetic head 26 of the arm 23 now rotates clockwise and reaches position D, the stops 16, 17, 18, which have been lowered in the meantime, are raised once more and the sections abut against them as before, and the magnetic head 26 of the arm 24 carries out the same operations of those carried out by the opposite head 26 of the arm 23.

When bundling is carried out to form one bundle alone, the stops 16 and 18 are kept in their lowered position and the foregoing operations are repeated with the exception of abutting against stops 16 and 18.

The bundling device 10 can have another cycle to make either two bundles of small sizes at the same time or only one bundle of a bigger size, whereby each head 26 puts only one layer at a time on each bundle 20 in formation, the purpose being to be able to lessen the force of attraction of the magnetic head 26, which, in the case of bars having a small cross section and low unit weight, might otherwise upset, superimpose or even lift the bars deposited earlier on the discharge line 21 during the placing of a new layer 19 on each bundle 20.

If a flanged sections is taken, the cycle takes place as follows: one layer of "n" sections is abutted against the stop 15 which is in its raised position; the stop 16 is lifted and another layer of "n" sections is abutted against it.

The two-armed lever 22 stays still, while the magnetic head 26 of the arm 23 is magnetized, rotates anti-clockwise and goes from position A to position B.

When the magnetic head 26 of the arm 23 is in position B above the stops 15, 16, the device 30 lifts the sections abutting the stops 15, 16 and brings them against magnetic head 26 of the arm 23 and then returns to its position of rest.

The opposite magnetic head 26 of the arm 24 is now at posiiton D; the two armed lever 22 rotates counter-clockwise about 180° and at the same time the magnetic head 26 of the arm 23 rotates clockwise and straightens up so as to reach position C.

The magnetic head 26 of the arm 23 is then demagnitized and each half of the split layer 19 of bars 11 is placed on its respective bundle 20.

The magnetic head 26 of the arm 23 has now left its sections and the magnetic head 26 of the arm 24 is at position A.

While the foregoing operations are being carried out, the stop 17 is raised first and thereafter the stop 18 is raised and a layer of "n minus one" sections abuts against each of stops 17, 18.

With the arm 24 in the position of the arm 23 the two-armed lever 22 now begins a new rotation of about 180°, during which the magnetic head 26 of the arm 24 takes the layers abutting on the stops 17, 18 and brings them to position C at the end of rotation of said lever 22.

The magnetic head 26 of the arm 24 is demagnetized and puts down the two halves of the split layer of sections upside down; each of said halves is laid down on the uppermost layer of sections positioned the right way up in each bundle 20 being formed.

When bundling is carried out to form only one bundle, the cycle remains substantially the same and all the operations described just now are repeated, apart from the abutting on the stops 16 and 18.

According to a second embodiment the two-armed lever 22 has only one of the two arms 23, 24 equipped with a magnetic head 26, with a suitable counterweight arranged on the opposite arm, as shown in FIG. 2 for instance.

According to said second embodiment the method of working of the head 26 remains the same as in the first embodiment.

The variant is therefore simpler, more economical and more suitable for rolling mills having a medium output. As stated earlier, an electromechanical or oleodynamic system can be employed to rotate the lever 22 and to operate the magnetic heads 26.

According to the invention the number of bundles which can be made up at the same time is not restricted to two alone and a greater number of bundles can be formed with a suitable lay-out of other retractable stops of the type described hereinbefore.

A preferred embodiment of the device of the invention and some variants of elements which form the device have been described, but other variants are possible without departing thereby from the scope of the invention.

I claim:

1. A device to bundle rolled bars which are advantageously flanged and channel sections coming from a delivery line, comprising a conveyor, retractable separating and sorting stops cooperating with said conveyor and transfer means able to take the bars from the conveyor and to place them in successive layers on suitable gathering and discharge means, said transfer means comprising a central shaft, a unidirectional rotatable symmetrical two-armed lever keyed to and supported on said central shaft, a swinging magnetic head having ends pivoted at one of its ends on an end of each of said arms around a horizontal axis substantially crosswise to said arm, said magnetic head rotatable multidirectionally and positionable so as to move towards and prolong the lengthwise axis of the relative arm when it is taking, carrying and laying down the bars.

2. The device as in claim 1, wherein said retractable separating stops can be actuated and positioned along the conveyor so as to position the bars to be abutted against said stops on said conveyor.

3. The device as in claim 1, including an actuator system secured to a flange solidly fixed to said central shaft which supports and rotates the two-armed lever, a second shaft parallel to said central shaft and pivoted on said flange and lever, a pinion mounted on said second shaft, a pinion mounted on said magnetic head, and a chain means interconnecting said pinions.

4. The device as in claim 1, including a discharge line and a vertically positionable storage surface able to receive successive layers forming the bundles and to discharge the complete bundles onto said discharge line.

5. The device as in claim 4, wherein said line to discharge bundles consists of powered rollers.

* * * * *